June 19, 1951     W. L. DUNMIRE     2,557,599

FISHING LURE

Filed Nov. 10, 1948

INVENTOR.
William L. Dunmire,
BY Victor J. Evans & Co.
ATTORNEYS

Patented June 19, 1951

2,557,599

UNITED STATES PATENT OFFICE 2,557,599

FISHING LURE

William L. Dunmire, Florence, Ala.

Application November 10, 1948, Serial No. 59,231

1 Claim. (Cl. 43—42.52)

My present invention relates to the general class of fishing hooks and tackle including artificial baits and more specifically to an improved fishing lure or trolling bait adapted for a zig-zag motion through the water, and provided with a tail-piece or flexible wing mounted on the barbed portion of the hook that is caused to flutter or wiggle during trolling movements of the tackle. While the lure is adapted for various types of sport fishing, it is especially designed for trolling downstream and across stream to catch large and small mouth bass and striped bass in either shallow running streams, or in streams of greater depth.

The body of the lure or artificial bait and its single barbed hook are so combined and compactly arranged as to avoid snagging on underwater rocks, logs, or other obstructions, and to permit freedom of movement in trolling operations; and the compactly arranged tackle of which the lure forms a component part may, when not in use, be stowed or packed neatly within the tackle box.

The invention includes a minimum number of parts that may with facility be manufactured at low cost of production, and the parts may be assembled with convenience, to insure a reliable non-snagging lure that is durable, and efficient in the performance of its required functions.

The invention consists in certain novel features of construction and combinations and arrangements of parts as will hereinafter be described and more particularly set forth in the appended claim.

In the accompanying drawings I have illustrated a complete example of a physical embodiment of my invention in which the parts are combined and arranged in accord with one mode I have devised for the practical application of the principles of my invention. It will however be understood that changes and alterations are contemplated and may be made in these mechanical structures and exemplifying drawings, within the scope of my claims, without departing from the principles of the invention.

Figure 1:
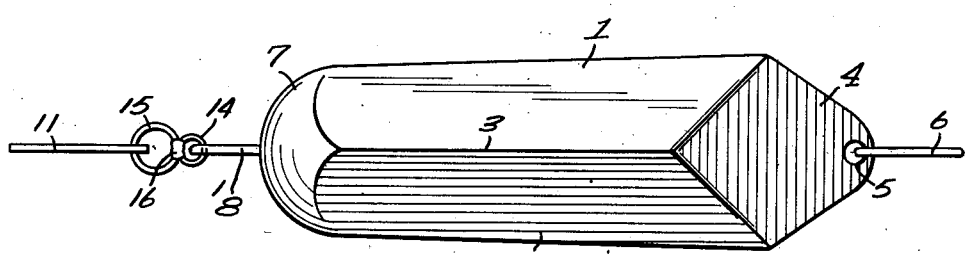
Figure 1 is a plan view of a lure in which my invention is physically embodied.
Figure 3:
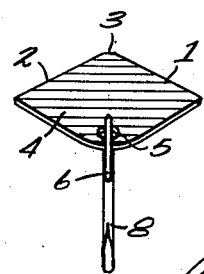
Figure 3 is a front end view of the lure.
Figure 2:
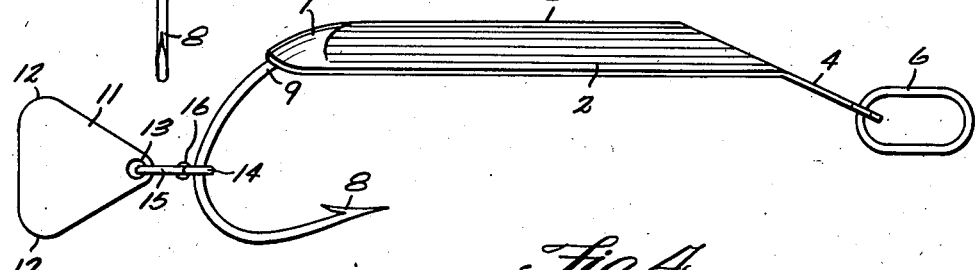
Figure 2 is an edge view of the lure.

In the preferred form of the invention shown in the drawings I employ a hollow or concavo-convex body of tinned sheet metal, copper, brass, or stainless steel that is angular in cross section and fashioned with longitudinally extending faces 1 and 2 forming a peak or apex edge 3 and a concavity in its undersurface.

The front end of the lure has an integral deflecting plate or nose plate 4 that declines from the body and projects beyond the edges of the faces 1 and 2 where it is provided with a hole 5 in which a steel wire ring, loop or link 6 is mounted, and to which the leader line of the fishing tackle is attached. The rear end of the angular body of the lure terminates in a longitudinally and transversely concaved portion 7 to form a closure of the trough-like body that is closed at its front end by the declining nose plate 4.

For luring purposes the different parts of the artificial bait may have contrasting appearances, as for instance, the nose may be painted black, or red, the body and tail piece white, with red or gold spots, and in some instances the entire surface of the body may be coated with clear varnish and then dipped in bronze powder, to provide a gold-plated finish for the lure.

A single barbed hook 8 projects from the rear of the lure in line with the longitudinal apex 3 of the body and behind the declining nose, and the curved shank 9 of the hook is straightened to conform to the contour of and lie in contact with the portion 7 and the longitudinal apex of the concavity of the undersurface of the angular body, where it is rigidly embedded in and united by a solder filling 10 with the body of the lure. The undersurface of the solder filling is concave in transverse cross section and one end of the solder filling extends below the nose plate 4 to reinforce the nose plate. In addition to its function of fastening the shank of the hook within the hollow body, the solder also provides the necessary weight to the body for stabilizing the movement of the lure as it is trolled through the stream of water, and this weight or load may be varied in adapting the lure for fishing in waters or varying depths.

At the rear of the body of the lure a triangular wing or trolling tail piece 11 of polished stainless steel, nickel, or other suitable metal or material is mounted in position to flutter or wiggle as the lure is pulled through the water, and one of the rounded corners 12 of the tail plate is perforated at 13.

The perforated and triangular plate is flexibly connected to the barbed portion of the hook by means of a double-eye or double connecting link having an eye 14 surrounding the curved barbed end of the hook and another eye 15 on which the tail plate is suspended, and these two eyes are rigidly united by soldering or welding at 16 to provide a reliable and substantial flexible connection between the hook and the plate 11.

Figure 4:
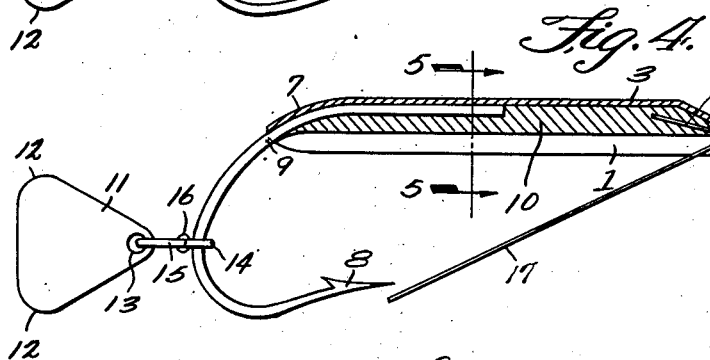
Figure 4 is a longitudinal sectional view of the lure through its central portion.
Figure 5:
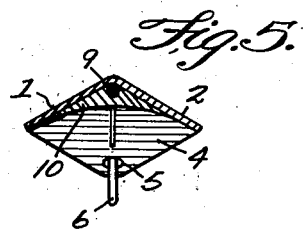
Figure 5 is a transverse sectional view at line 5—5 of Fig. 4.

In the slightly modified form of the invention disclosed in Fig. 4, a wire deflecting guard of resilient material, as 17, is employed which is attached to the lure with its bent shank 18 embedded in the solder filling 10 in the concave side of the lure. The resilient guard extends diagonally from the front end of the lure at its hook side toward the barb of the hook, and terminates just outside the barb, in order that the lure, when encountering an obstruction such as an underwater log or rock, will ride or glide over the obstruction without danger of the hook snagging or becoming entangled with the obstruction.

Having thus fully described my invention, what I claim as new and desire to secure by Letters Patent is:

An artificial bait comprising a hollow concavo-convex metallic body angular in cross section to form a concavity in its undersurface and having an angularly disposed, deflecting flat nose plate at its forward end and having a rear end concaved longitudinally and transversely, a solder filling in said concavity and extending below the nose plate to reinforce the nose plate and the undersurface of the filling being concave in transverse cross section and forming a weight for the body, a link carried by the nose plate for attachment of a leader line, and a barbed hook having a longitudinally extended shank within said concavity and extending outwardly of said rear end of the body and projecting forwardly in said concavity toward the nose plate and fastened in said concavity by said solder filling with the shank in contact with the body and the curve of the hook in contact with the undersurface of said rear end of the body.

WILLIAM L. DUNMIRE.

REFERENCES CITED

The following references are of record in the file of this patent:

UNITED STATES PATENTS

| Number | Name | Date |
|---|---|---|
| 1,252,721 | Rice | Jan. 8, 1918 |
| 1,406,834 | Fisher | Feb. 14, 1922 |
| 1,789,630 | Knight | Jan. 20, 1931 |
| 1,890,400 | Miller | Dec. 6, 1932 |
| 1,990,693 | Hildebrandt | Feb. 12, 1935 |
| 2,266,234 | Mitchell | Dec. 16, 1941 |
| 2,380,328 | Pecher | July 10, 1945 |